(12) United States Patent
Chen et al.

(10) Patent No.: US 7,565,506 B2
(45) Date of Patent: Jul. 21, 2009

(54) METHOD AND APPARATUS FOR DELIVERING CONTENT BASED ON RECEIVERS CHARACTERISTICS

(75) Inventors: An Mei Chen, San Diego, CA (US); Joseph Barone, San Diego, CA (US); Gordon Kent Walker, Poway, CA (US); Bruce Collins, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 422 days.

(21) Appl. No.: 11/270,413

(22) Filed: Nov. 8, 2005

(65) Prior Publication Data

US 2007/0067597 A1  Mar. 22, 2007

Related U.S. Application Data

(60) Provisional application No. 60/715,439, filed on Sep. 8, 2005.

(51) Int. Cl.
G06F 13/00 (2006.01)
(52) U.S. Cl. .................. 711/170; 711/154; 711/163
(58) Field of Classification Search ............ 711/154, 711/163, 170
See application file for complete search history.

(56) References Cited

U.S. PATENT DOCUMENTS

| | | | |
|---|---|---|---|
| 5,978,649 A | 11/1999 | Kahn | |
| 6,075,526 A | 6/2000 | Rothmuller | |
| 6,122,658 A | 9/2000 | Chaddha | |
| 6,477,707 B1 | 11/2002 | King et al. | |
| 6,654,423 B2 * | 11/2003 | Jeong et al. | 375/240.29 |
| 6,671,853 B1 | 12/2003 | Burkett et al. | |
| 6,678,215 B1 * | 1/2004 | Treyz et al. | 368/10 |
| 6,785,551 B1 | 8/2004 | Richard | |
| 6,863,557 B2 * | 3/2005 | Mills et al. | 439/377 |
| 6,886,017 B1 | 4/2005 | Jackson et al. | |
| 7,003,117 B2 | 2/2006 | Kacker et al. | |
| 7,053,958 B2 | 5/2006 | Collins et al. | |
| 7,085,291 B2 | 8/2006 | Zhang et al. | |
| 7,117,439 B2 | 10/2006 | Barrett et al. | |

(Continued)

FOREIGN PATENT DOCUMENTS

EP    0609936    8/1994

(Continued)

OTHER PUBLICATIONS

Earnshaw, et al., "The TV-Anytime Content Reference Identifier," Network Working Group, RFC 4078, May 2005.

(Continued)

*Primary Examiner*—Reba I Elmore
(74) *Attorney, Agent, or Firm*—Abdollah Katbab; Gerald P. Joyce, III

(57) ABSTRACT

Media distribution systems may include methods and apparatus to perform memory management on a wireless devices configured to receive non-real time portions of media services. Such methods and apparatus may be based upon an allowable capacity of presentations storable in device memory, as well as on a required memory associated with each presentation in a media service. Such methods and apparatus allow a device to subscribe to a media service based upon sufficient available memory in the device to support the service.

64 Claims, 13 Drawing Sheets

U.S. PATENT DOCUMENTS

| | | |
|---|---|---|
| 7,120,932 B2 | 10/2006 | Lockhart et al. |
| 7,305,074 B2 | 12/2007 | Hartung et al. |
| 2001/0052133 A1 | 12/2001 | Pack et al. |
| 2002/0016801 A1 | 2/2002 | Reiley et al. |
| 2002/0042915 A1 | 4/2002 | Kubischta et al. |
| 2002/0124259 A1 | 9/2002 | Chang |
| 2002/1242590 | 9/2002 | Chang |
| 2002/0157002 A1 | 10/2002 | Messerges et al. |
| 2003/0046369 A1* | 3/2003 | Sim et al. .................... 709/220 |
| 2003/0069881 A1 | 4/2003 | Huttunen |
| 2003/0117445 A1 | 6/2003 | Hendricks et al. |
| 2003/0212999 A1* | 11/2003 | Cai ............................ 725/119 |
| 2004/0028049 A1 | 2/2004 | Wan |
| 2004/0044873 A1* | 3/2004 | Wong et al. .................. 711/218 |
| 2004/0083492 A1 | 4/2004 | Goode et al. |
| 2004/0117857 A1* | 6/2004 | Bisdikian et al. ............ 725/141 |
| 2004/0153547 A1 | 8/2004 | Trossen |
| 2004/0177383 A1 | 9/2004 | Martinolich et al. |
| 2004/0193545 A1 | 9/2004 | Shlasky |
| 2005/0015765 A1* | 1/2005 | Covell et al. ................ 718/100 |
| 2005/0090235 A1 | 4/2005 | Vermola et al. |
| 2005/0108770 A1* | 5/2005 | Karaoguz et al. ............ 725/131 |
| 2005/0120369 A1* | 6/2005 | Matz ............................ 725/40 |
| 2005/0132207 A1 | 6/2005 | Mourad |
| 2005/0188403 A1 | 8/2005 | Kotzin |
| 2006/0031882 A1 | 2/2006 | Swix et al. |
| 2006/0136905 A1 | 6/2006 | Thissen et al. |
| 2006/0205395 A1 | 9/2006 | Barone et al. |
| 2006/0277576 A1 | 12/2006 | Acharya et al. |

FOREIGN PATENT DOCUMENTS

| | | |
|---|---|---|
| EP | 0749221 | 12/1996 |
| EP | 1089560 | 4/2001 |
| EP | 1193976 | 4/2002 |
| WO | 00021006 | 4/2000 |
| WO | 00033197 | 6/2000 |
| WO | 01063900 | 8/2001 |
| WO | 02065803 | 8/2002 |
| WO | 02084524 | 10/2002 |
| WO | WO02099673 A | 12/2002 |
| WO | WO2004021671 A | 3/2004 |
| WO | 2004079589 | 9/2004 |
| WO | 2005045603 | 5/2005 |
| WO | WO2006015226 A | 2/2006 |
| WO | 2006099239 | 9/2006 |

OTHER PUBLICATIONS

Peyret, et al., "Smart Cards Provide Very High Security and Flexibility in Subscribers Management," Aug. 1990, IEE Transactions and Consumer Electronics, vol. 36, No. 3, pp. 744-752.

Wong, et al., "Xstream: A Middleware for Streaming XML Contents over Wireless Environments," IEEE Transactions on Software Engineering, vol. 30, No. 12, Dec. 2004, pp. 918-935.

Wong, et al., "Efficient Management of XML Contents over Wireless Environment by Xstream," 2004 ACM Symposium on Applied Computing, pp. 1122-1127.

ISO-IEC 15706, Information and documentation - International standard Audiovisual Number (ISAN), 2002.

IPDC in DVB-H: Technical Requirements CBMS1026 v1.0.0 Rev. 1/TM 3095 Rev.2, 2004.

OMA: "Mobile Broadcast Services Requirements" Candidate Version 1.0, Feb. 3, 2005, pp. 1-69, pp. 14-21.

International Search Report - PCT/US06/034814, International Search Authority - European Patent Office, Jan. 24, 2007.

Written Opinion - PCT/US06/034814, International Search Authority - European Patent Office, Jan. 24, 2007.

International Preliminary Report on Patentability - PCT/US06/034814, IPEA - European Patent Office, Oct. 12, 2007.

International Search Report - PCT/US06/035697, International Search Authority - European Patent Office, Apr. 5, 2007.

Written Opinion - PCT/US06/035697, International Search Authority - European Patent Office, Apr. 5, 2007.

International Preliminary Report on Patentability - PCT/US06/035697, The International Bureau on WIPO - Geneva, Switzerland, Mar. 18, 2008.

International Search Report - PCT/US06/034815, International Search Authority - US, Jun. 23, 2005.

Written Opinion - PCT/US06*034815, International Search Authority - US, Jun. 23, 2008.

International Search Report - PCT/US06/035440, International Search Authority - European Patent Office, Jan. 22, 2007.

Written Opinion - PCT/US06/035440, International Search Authority - European Patent Office, Jan. 22, 2007.

International Preliminary Report on Patentability - PCT/US06/035440, The International Bureau of WIPO - Geneva, Switzerland, Mar. 22, 2008.

International Search Report - PCT/US06/035439, International Search Authority - European Patent Office, Mar. 9, 2007.

Written Opinion - PCT/US06/035439, International Search Authority - European Patent Office, Feb. 9, 2007.

International Preliminary Report on Patentability - PCT/US06/035439, The International Bureau of WIPO - Geneva, Switzerland, Mar. 27, 2008.

International Search Report - PCT/US06/060690, International Search Authority - European Patent Office, Mar. 23, 2007.

Written Opinion - PCT/US06/060690, International Search Authority - European Patent Office, Mar. 23, 2007.

International Preliminary Report on Patentability - PCT/US06/060690, The International Bureau of WIPO - Geneva, Switzerland, May 22, 2008.

International Search Report - PCT/US06/060684, International Search Authority - European Patent Office, Mar. 23, 2007.

Written Opinion - PCT/US06/060684, International Search Authority - European Patent Office, Mar. 23, 2007.

International Preliminary Report on Patentability - PCT/US06/060684, The International Bureau of WIPO - Geneva, Switzerland, May 22, 2008.

International Search Report - PCT/US06/060689, International Search Authority - European Patent Office, May 22, 2007.

Written Opinion - PCT/US06/060689, International Search Authority - European Patent Office, May 22, 2007.

International Preliminary Report on Patentability - PCT/US06/060689, The International Bureau of WIPO - Geneva, Switzerland, May 22, 2008.

International Search Report - PCT/US06/060691, International Search Authority - European Patent Office, May 18, 2007.

Written Opinion - PCT/US06/060691, International Search Authority - European Patent Office, May 18, 2007.

International Preliminary Report on Patentability - PCT/US06/060691, The International Bureau of WIPO - Geneva, Switzerland, May 22, 2008.

* cited by examiner

| | |
|---|---|
| $i$ : | Presentation index, where $i = 1,2,3...N$ |
| $N$ : | Total number of presentations in a given schedule of presentations |
| $Psize_i$ : | Required memory for Presentation $i$ |
| SMRS : | Subscribed Memory Requirement per Service |

METHOD AND APPARATUS FOR DELIVERING CONTENT BASED ON RECEIVERS CHARACTERISTICS

CLAIM OF PRIORITY UNDER 35 U.S.C. §119

The present Application for Patent claims priority to Provisional Application No. 60/715,439 entitled "Method for Deriving Subscribed Memory Requirement For Clipcasting Service," filed Sep. 8, 2005, assigned to the assignee hereof and hereby expressly incorporated by reference herein.

REFERENCE TO CO-PENDING APPLICATIONS FOR PATENT

The present Application for Patent is related to the following co-pending U.S. Patent Applications:

"METHODS AND APPARATUS FOR DISTRIBUTING CONTENT TO SUPPORT MULTIPLE CUSTOMER SERVICE ENTITIES AND CONENT PACKAGERS", Ser. No. 11/270,199, filed concurrently herewith, assigned to the assignee hereof, and expressly incorporated by reference herein, "APPARATUS AND METHODS OF OPEN AND CLOSED PACKAGE SUBSCRIPTION", Ser. No. 11/270,372, filed concurrently herewith, assigned to the assignee hereof, and expressly incorporated by reference herein, "APPARATUS AND METHODS FOR PROVIDING AND PRESENTING CUSTOMIZED CHANNEL INFORMATION", Ser. No. 11/270,166, filed concurrently herewith, assigned to the assignee hereof, and expressly incorporated by reference herein, "APPARATUS AND METHODS FOR DELIVERING AND PRESENTING AUXILIARY SERVICES FOR CUSTOMIZING A CHANNEL", Ser. No. 11/270,370, filed concurrently herewith, assigned to the assignee hereof, and expressly incorporated by reference herein, "METHODS AND APPARATUS FOR DELIVERING REGIONAL PARAMETERS", Ser. No. 11/270,210, filed concurrently herewith, assigned to the assignee hereof, and expressly incorporated by reference herein, "METHODS AND APPARATUS FOR FRAGMENTING SYSTEM INFORMATION MESSAGES IN WIRELESS NETWORKS", Ser. No. 11/270,168, filed concurrently herewith, assigned to the assignee hereof, and expressly incorporated by reference herein, "FLEXIBLE SYSTEM FOR DISTRIBUTING CONTENT TO A DEVICE", Ser. No. 11/270,165, filed concurrently herewith, assigned to the assignee hereof, and expressly incorporated by reference herein, "SYSTEM FOR DISTRIBUTING PACKAGES AND CHANNELS TO A DEVICE", Ser. No. 11/270,167, filed concurrently herewith, assigned to the assignee hereof, and expressly incorporated by reference herein; and "METHODS AND APPARATUS FOR PROVIDING SYSTEM INFORMATION TO A WIRELESS DEVICE", Ser. No. 11/735,044, filed concurrently herewith, assigned to the assignee hereof, and expressly incorporated by reference herein.

BACKGROUND

The disclosed aspects relate generally to the operation of media distribution systems, and more particularly, to methods and apparatus for managing memory requirements and presentation availability regarding the downloading of non-real time media.

Media distribution systems comprise various service types, including but not limited to: real time; non-real time; and IP Datacast ("IPDC") service types; and combinations thereof.

A real time service normally delivers content within a specific second and is typically selected for immediate consumption, delivering streaming video, audio and text. For example, a real time service may provide a live broadcast of a sporting event or a live performance. IP Datacast is a form of real time service that delivers an IP multicast data stream to a specific address within seconds and is primarily aimed at handset data applications including stock, weather, traffic, and emergency services. A non-real time service, i.e. "Clipcast" media, is normally scheduled over minutes and is typically stored for later presentation or viewing. For example, non real time service may provide pre-recorded content, such as an advertisement, information on a presentation, etc., which is saved in memory on a media-capable device and later recalled for viewing. Non-real time media is not limited to non-real time services. Non-real time media may be a component of both real-time and non-real time services.

Additionally, some services may provide some combination of real-time and non-real-time services, such as displaying player information during a live broadcast of a sporting event in which the player is participating.

Because non-real time media is normally downloaded to a device for later viewing, the implementation of non-real time media delivery may benefit from memory management on the user device to minimize the loss of data due to insufficient memory at the time of media delivery.

Accordingly, it would be advantageous to provide apparatus and methods to provide memory management on a user device in support of services comprising non-real time media.

SUMMARY

The described aspects comprise apparatus, methods, computer readable media and processors operable to provide memory management on a user device in support of services comprising non-real time media.

Such apparatus and methods are operable to compute memory requirements for communicating non-real time portions of media services to a networked device. The calculated memory requirements may then be forwarded to a device operable to allow a user to subscribe to the service based upon sufficient available memory in the device.

In one aspect, a method of determining the total amount of memory required on a device to receive non-real time media may comprise receiving inputs, an indication of a number of presentations concurrently storable on the device and, a memory requirement value of each presentation associated with the service. The method further includes calculating an amount of memory required on the device in order for a user to subscribe to the service based upon the received inputs, and generating a record comprising the amount of memory required. In a related aspect, at least one processor is configured to perform the above-described actions. In another related aspect, a computer program is resident in a computer readable medium that, when executed, directs a computer device to perform the actions noted above.

In another aspect a service provisioning server, may comprise a means for receiving a value associated with an allowable number of presentations concurrently storable on the device, a means for receiving a memory requirement value of each presentation associated with a schedule of presentations, a means for calculating an amount of memory required on the device in order for a user to subscribe to the service based on the value associated with the number of allowable presentations and based on the memory requirement values, and a means for generating a record comprising the amount of memory required.

In yet another aspect, a service provisioning computer may comprise a service planner module, wherein the service planning module further comprises a service memory requirement per service ("SMRS") module. The SMRS module may be operable to receive a buffer value indicating an allowable number of presentations storable on the device, and to receive a memory requirement value of each presentation associated with a media service. Further, the computer is operable to calculate an amount of memory required on the device in order for a user to subscribe to the service, and to generate a record comprising the amount of memory required.

In yet another aspect a method for subscribing a user for media communications may comprise receiving a memory requirement for communicating media to a device, determining an available memory on the device, and allowing the user to subscribe to a media service, in order to receive the media, based upon a predetermined relationship between the available memory and the required memory. In a related aspect, at least one processor is configured to perform the above-described actions. In another related aspect, a computer program is resident in a computer readable medium that, when executed, directs a computer device to perform the actions noted above.

In still another aspect, a method for subscribing a user to a media communication service may comprise a means for receiving a memory requirement for the service, a means for determining available memory on the device, and a means for allowing the user to subscribe to the service, based upon a predetermined relation ship between the available memory and the required memory.

In another aspect, a wireless communication device comprises a memory having a memory requirement value associated with an amount of memory to support a subscription to a given media service, and having an available memory value. The device further comprises a subscription manager module operable to compare the available memory to the memory requirement and determine an ability to subscribe to the service.

BRIEF DESCRIPTION OF THE DRAWINGS

The disclosed aspects will hereinafter be described in conjunction with the appended drawings provided to illustrate and not to limit the disclosed aspects, wherein like designations denote like elements, and in which.

DETAILED DESCRIPTION

The following detailed description describes one or more aspects of a Media Distribution System ("MDS") comprising apparatus and methods to derive total memory requirements for downloading of non-real time media to a wireless device, and to derive the availability duration of a presentation on the device. Furthermore, these derived calculations are forwarded to the device where application software resident in memory is operable to manage the subscription of services comprising non-real time media based upon the forwarded information. In an alternative aspect, the MDS may receive a request to subscribe to a service, and an amount of available memory, from the wireless device. Then the MDS may make a determination as to whether or not the subscription request can be fulfilled by comparing the available memory to the total memory requirements associated with the requested service.

The apparatus and methods are especially well suited for use in wireless environments, but may be suited in any type of network environment, including but not limited to, communication networks, public networks, such as the Internet, private networks, such as virtual private networks (VPN), local area networks, wide area networks, long haul networks, or any other type of data communication network.

Figure 1:
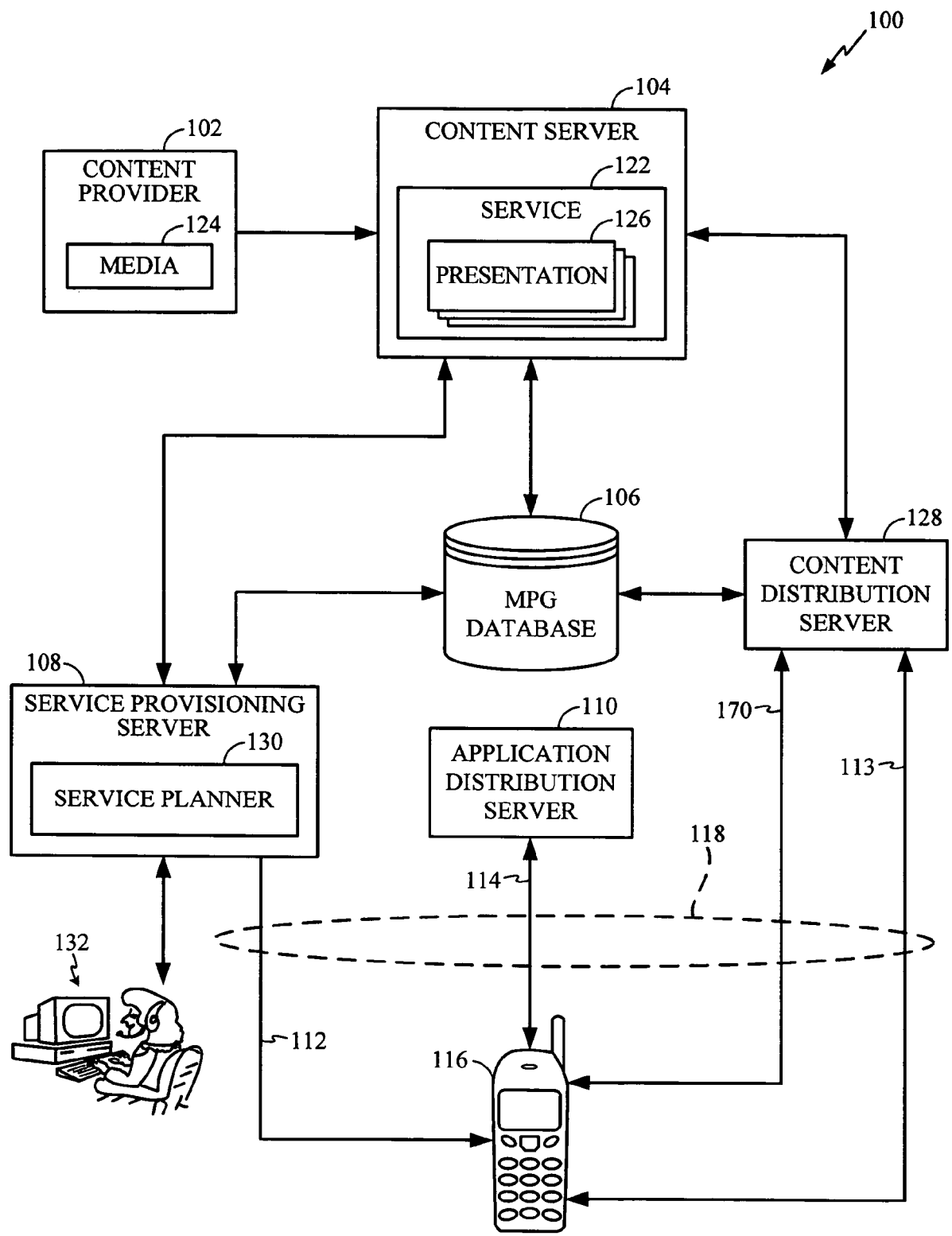
FIG. 1 is an aspect of a schematic diagram of a media distribution system comprising methods and apparatus for managing memory on a user device in support of non-real time delivery of media.

FIG. 1 illustrates one aspect of a Media Distribution System ("MDS") 100 for downloading a service 122 to at least one wireless device 116, and comprises a Content Provider 102, a Content Server 104, a Content distribution server 128, a service provisioning server 108, a database 106, and an Application distribution server 110.

The Content Provider 102 operates to provide the content for distribution to users in the network 118 through Content Server 104 and content distribution server 128. The content comprises media 124, such as video, audio, multimedia content, clips, scripts, programs, data and any other suitable content. Media 124 may comprise real-time content, non real time content, and/or a combination of the two. Media 124, either individually or in combination, may form a presentation 126 that may be viewed or otherwise output on a device.

The Content Server 104 operates to provide the Content distribution server 128 with presentations 126 associated with a service 122. Service 122 comprises a sequence of presentations 126 offered under a single label, or identifier. Each presentation 126 may comprise real time content, non-real time content, and mixed combinations of real and non-real time content. Furthermore, each service 122 may provide real time presentations, non-real time presentations, and both real-time and non-real time presentations. For example, a real time presentation may be a live broadcast of a sporting event. Further, for example, a non real time presentation may be an advertisement. Additionally, a combined presentation may include, for example, links to player information in combination with a live broadcast of a sporting event.

Database 106 may comprise records that define a Media Presentation Guide ("MPG") providing a broadcast schedule, or a time at which device 116 may present presentations 126 to a user and a time at which device 116 may retrieve non-real time content. In one non-limiting aspect, the MPG may be transmitted to a device 116 at the time of service activation, although it may be broadcast or otherwise transmitted at any time. Although database 106 is described as a data repository, it should be noted that any interface could be used that provides the media presentation guide information to the other components of system 100.

Device-server interfaces 112, 113, and 114 are operable to interface the device 116 with MDS 100 server components. Interfaces 112, 113, and 114 may be a physical connection and/or a wireless connection using air interface techniques such as code division multiple access ("CDMA"), wideband code division multiple access ("WCDMA"), universal mobile telecommunications system ("UMTS"), advanced mobile phone service ("AMPS"), time division multiple access ("TDMA"), frequency division multiple access ("FDMA"), orthogonal frequency division multiple access ("OFDMA"), global system for mobile communications ("GSM"), single carrier ("1X") radio transmission technology ("RTT"), evolution data only ("EV-DO") technology, general packet radio service ("GPRS"), enhanced data GSM environment ("EDGE"), high speed downlink data packet access ("HSPDA"), analog and digital satellite systems, and any other technologies/protocols that may be used in at least one of a wireless communications network and a data communications network. Interface 112 provides service activation and subscription information from service provisioning server 108; interface 113 provides MPG and content delivery from the content distribution server 128; and interface 114 provides application download capability between the device 116 and the application distribution server 110.

Additionally, it should be noted that servers 14, 106, 108, 110 and 128 which define a portion of media distribution system 100 may be combined into a single server, and/or may each be a combinations of one or more servers. Further, these servers may be located together and/or remotely from one another. Additionally, servers 14, 106, 108, 110 and 128 may communicate via a physical connection and/or via a wireless connection using the air interface techniques discussed above.

Figure 2:
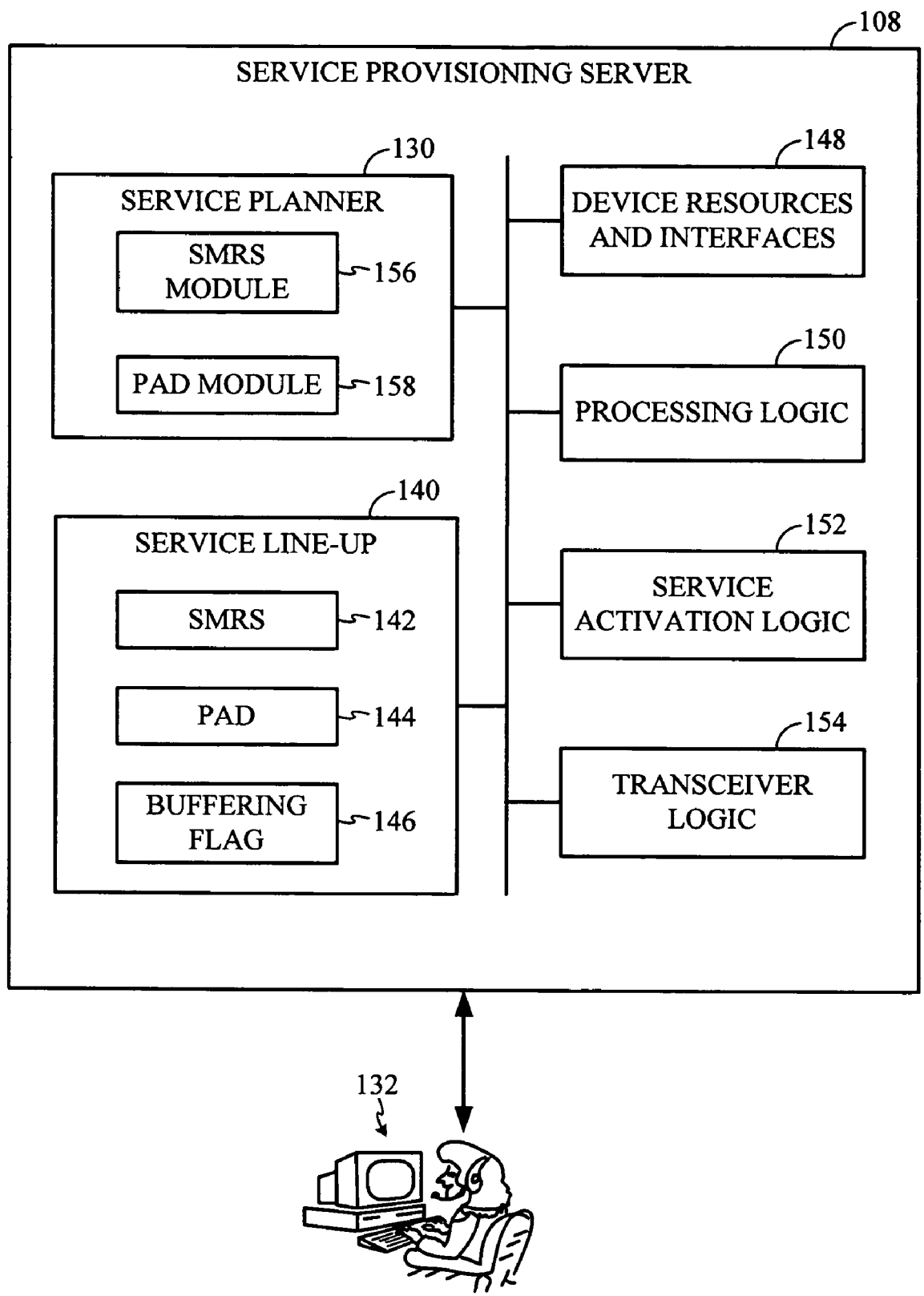
FIG. 2 is one aspect of an architecture diagram of the service provisioning server of FIG. 1.

FIG. 2 illustrates an aspect of the service provisioning server 108. The service provisioning server 108 is operable to generate a service line-up message ("SLU") 140 based upon inputs provided by a service manager 132. The service provisioning server 108 may include interconnected logical modules, including processing logic 150, service acquisition logic 152, transceiver logic 154 operable to manage communications with other network components, and various device resources and interfaces 148, including any input/output devices.

The service provisioning server 108 may include a service planner module 130, operable by a service manager 132 for planning service 122. In one non-limiting aspect, the service planner module 130 may provide the functions of scheduling presentations, computing the SMRS 142, and deriving a presentation availability duration (PAD) 144 for each presentation 126 (FIG. 1) associated with a service 122 (FIG. 1). In one aspect, the service planner module 130 generates the following information to be incorporated in the SLU 140.

Contact Window start time ("Tcws"): The Tcws is the first time at which the device 116 can contact the distribution server 128 to download a presentation 126. This value is provided for each scheduled presentation 126. For any presentation 126 that cannot be scheduled, the service planner module 130 may set the corresponding Tcws to zero.

Contact Window duration: The Contact Window duration is the time interval during which device 116 may contact the MDS to download a presentation 126, and begins at the contact window start time, Tcws. The value of the contact window duration may be provided for each scheduled presentation 126. For any presentation 126 that cannot be scheduled, the service planner module 130 may set the corresponding contact window duration to zero.

Subscribed Memory Requirement per service ("SMRS"): The SMRS value 142 is the amount of memory required on the device 116, for a given schedule of programs, in order for the user to subscribe to the service 122. When calculating SMRS 142, the service planner module 130 may, in one aspect, only consider presentations that have been successfully scheduled. In one aspect, the SMRS 142 may be calculated by operation of a SMRS Module 156 within the service planner module 130 in accordance with the flowchart of FIG. 6.

Presentation Availability Duration ("PAD"): The PAD value 144 is the time interval during which presentation 126 is available for viewing on the device. This value may be provided for each presentation. For presentations that cannot be scheduled, the service planner module may set the PAD 144 to zero. In one aspect, a PAD Module 158 within service planner module 130 may calculate PAD value 142 in accordance with the flowchart of FIG. 8.

Service 122 comprises at least one presentation 126, and over the course of the scheduled service 122, multiple presentations may be downloaded to device 116, each presentation 126 having its own PAD value 144.

Figure 3:
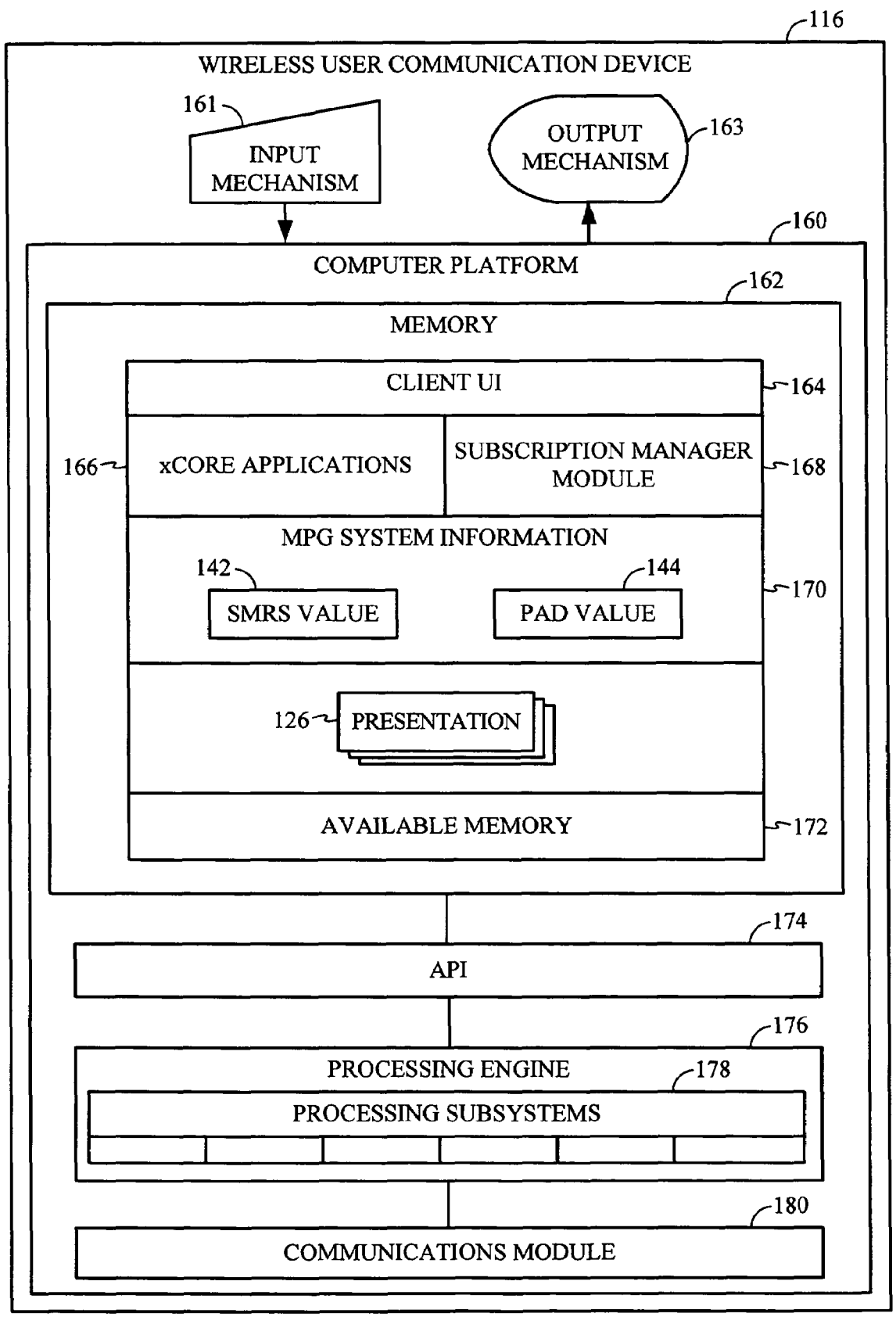
FIG. 3 is one aspect of an architecture diagram of the wireless device of FIG. 1.

Upon generation and acceptance of the SLU 140, service manager 132 may transmit a command to the service provisioning server 108 to commit the SLU 140 to MPG database 106. Upon receiving the command to commit the SLU 140 into the database 106, the service provisioning server 108 may send a new SLU notification message along with SLU 140 to Content Server 104 that saves the SLU 140 into MPG database 106. In addition, at least one of the Content Server 104 and the Content distribution server 128 may transmit the SMRS value 142 and the PAD value 144 to device 116 as part of MPG/system information 170 (FIGS. 1 and 3). Non-limiting, the MPG/system information 170 may be transmitted to the device 116 at service activation time, or broadcast or otherwise transmitted at any predetermined time.

FIG. 3 illustrates an aspect of wireless device 116. Device 116 may include any type of computerized, wireless device, such as a mobile terminal, a mobile or cellular telephone, a personal digital assistant, a portable/laptop computer, and even a separate computer platform that has a wireless communications portal, and which also may have a wired connection to a network or the Internet.

Device 116 may also include input mechanism 161 for generating inputs into device 116, and output mechanism 163 for relaying information to the user of the wireless device. For example, input mechanism 161 may include a mechanism such as a key or keyboard, a mouse, a touch-screen display, and a voice recognition module, while output mechanism 163 may include, but is not limited to, a display, an audio speaker, and a haptic feedback mechanism.

Computer platform 160 may be operable to: transmit data across wireless network 118; receive and execute software applications; and to display data transmitted from application server 110, content distribution server 128, and/or service provisioning server 108, or any other computer device connected to wireless network 118. Computer platform 160 may also include a memory 162, which may comprise volatile and nonvolatile memory such as read-only and/or random-access memory (RAM and ROM), EPROM, EEPROM, flash cards, or any memory common to computer platforms. Further, memory 162 may include one or more flash memory cells, or may be any secondary or tertiary storage device, such as magnetic media, optical media, tape, or soft or hard disk.

Further, computer platform 160 may include a processing engine 176, which may be an application-specific integrated circuit ("ASIC"), or other chipset, processor, logic circuit, or other data processing device. Processing engine 176 is operable to execute an application programming interface ("API") layer 174 that may interface with any resident programs, such as subscription manager module 168, stored in memory 162 of device 116. In one non-limiting aspect, API 174 is a runtime environment executing on the respective wireless device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices.

Processing engine 176 includes various processing subsystems 178 embodied in hardware, content, software, and combinations thereof, that enable the functionality and the operability of device 116 on wireless network 118. For example, processing subsystems 178 allow for initiating and maintaining communications, and exchanging data, with other networked devices.

In one aspect, such as in a cellular telephone, processing engine 176 may include one or a combination of processing subsystems 178, such as: sound, non-volatile memory, file system, transmit, receive, searcher, layer 1, layer 2, layer 3, main control, remote procedure, handset, power management, diagnostic, digital signal processor, vocoder, messaging, call manager, Bluetooth® system, Bluetooth® LPOS, position determination, position engine, user interface, sleep, data services, security, authentication, USIM/SIM, voice services, graphics, USB, multimedia such as MPEG, GPRS, etc. For the disclosed aspects, processing subsystems 178 may include any subsystem components that interact with applications executing on computer platform 160. For example, processing subsystems 178 may include any subsystem components that receive data reads and data writes from API 174 on behalf of a memory resident subscription manager module 168, such as determining the amount of available memory 172.

Computer platform 160 may further include core applications 166 required to perform basic cellular functions and a communications module 180 embodied in hardware, content, software, and combinations thereof, operable to enable communications among the various components of device 116 and with wireless network 118.

Subscription manager module 168 is operable to handle subscription requests by the user and provide the messages required to subscribe to service 122. Furthermore, subscription manager module 168 may be operable to analyze memory 162 to determine whether the available memory 172 is sufficient to allow the user to subscribe to service 122. This determination may be made based upon the SMRS value 142 downloaded to the device 116 as part of MPG/system information 170.

Memory 162 may also include a client User Interface ("UI") 164 operable, in conjunction with input mechanism 161 and output mechanism 163, to allow a user to perform input and output operations on the wireless device 116. In regards to the subscription manager module 168, the client UI 164 enables the user to request a service 122 as well as display any messages generated by the Subscription manager module 168 regarding the availability or unavailability of memory in support of the service 122.

Figure 4:
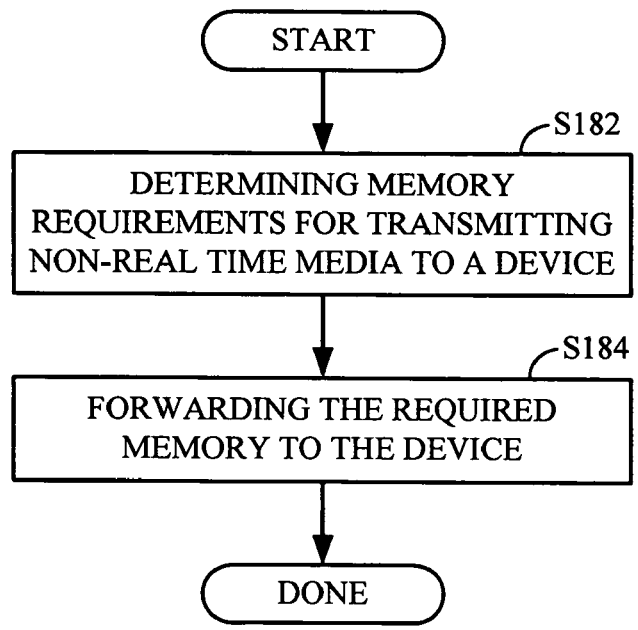
FIG. 4 is a flowchart of one aspect of a method operable by a service provisioning server for deriving the subscribed memory requirement per service for non-real time content according to the system of FIG. 1.

FIG. 4 describes one aspect of a method operable by system 100, such as by the service provisioning server 108, to manage device memory in support of transmission of non-real time media. At step S182, the method includes determining the amount of memory required in support of transmission of non-real time data to a device. For example, in one aspect, service provisioning server 108 (FIG. 1) obtains these values from a local database, and/or receives these values as inputs from a system operator 132 (FIG. 1). The inputs may include information such as one or more of: an allowable capacity of presentations in terms of number and/or memory size, a number of presentations in a program schedule, a required memory for each presentation, a delivery time of each presentation, a presentation availability duration or an expiration or end of viewing time of each presentation, and a number of presentations to store in device memory at one time, etc. Based on the received inputs, service provisioning service 108 determines a value for SMRS 142 (FIG. 2) for a device to subscribe to the service. Further, at step S184, the method includes forwarding the required memory to a device. For example, in one aspect, service provisioning server 108 transmits SMRS 142 to device 116 for use in a subscription ability determination which determines if the device is able to subscribe to a service 122 based on the available memory 172 being sufficient to support the service 122, i.e. being equal to or greater than the value of SMRS 142.

A description of variables in FIGS. 6-9 and 11-13 include:
i: Presentation index
$Tv_i$: Viewing Time for Presentation i
$Tcws_i$: Contact Window Start Time for Presentation i
$Psize_i$: Memory Required for Presentation i
N: Maximum index for Presentations, i.e. the total number of presentations in a given schedule of programs for a service
SMRS: Service Memory Requirement per Service (SMRS 142)
TempMem: Temporary memory requirement
BFlag: Buffer flag value within the set of values 1, 2, ... n, where n is the number of presentations to store in device memory at one time.

Figure 6:
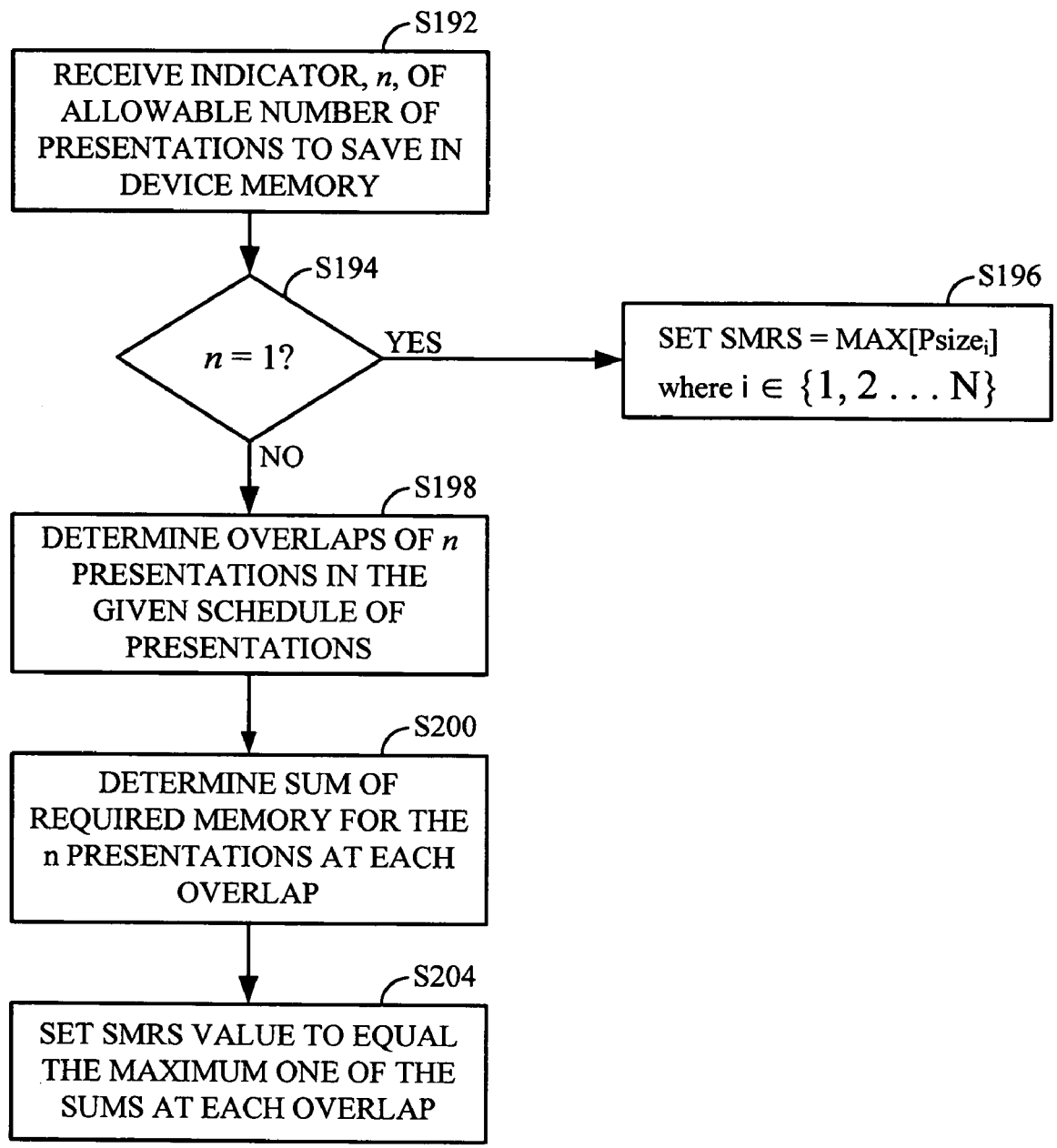
FIG. 6 is a detailed flowchart of one aspect for deriving the subscribed memory requirement per service according to the system of FIG. 1.

Referring to FIG. 6, one aspect of step S182 of FIG. 4 for determining a subscribed memory requirement per service, SMRS 142, includes receiving an indicator, n, of a number of presentations to concurrently save in a device memory (step S192). For example, in one aspect, operator 132 (FIG. 1) may enter a buffer value of n into system 100 to represent the number of presentations that are concurrently storable.

The method further includes determining whether the allowable number of concurrently saved presentations is equal to one (step S194). If n=1, then the value of SMRS 142 is set to the value of the maximum required memory value associated with any of the N presentations in the schedule of programs (step S196).

Figure 7:
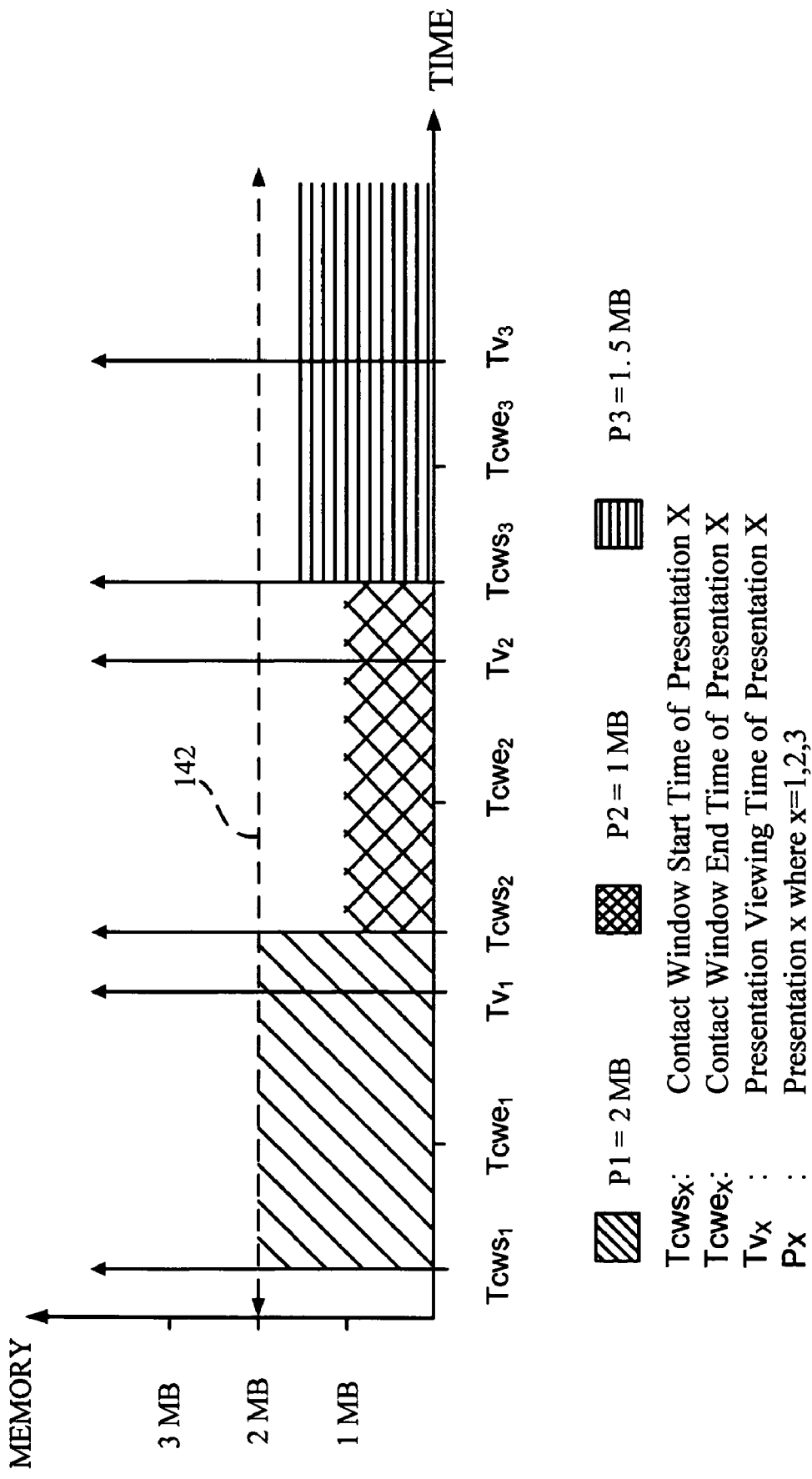
FIG. 7 is a chart of one aspect of presentations stored in memory over time based upon a buffer flag value equal to 1, including the subscribed memory requirement per service according to the flowchart of FIG. 6.

For example, referring to FIG. 7, the SMRS 142 is set to equal 2 megabytes (MB). In this case, the schedule of programs includes presentations P1, P2 and P3. The memory requirements for each presentation are: P1=2 MB; P2=1 MB; and P3=1.5 MB. Since buffering flag 146 equals 1, the method executes step S196 to determine the maximum of the required memory associated with each presentation. The maximum required memory of P1, P2 and P3, in this example, is therefore the 2 MB required by P1. Thus, SMRS 142 is set to 2 MB. In this example, since the buffer flag value 146 is set to 1, any presentation in device memory is deleted to make room for the next presentation.

Returning to FIG. 6, steps S198 through S210 are executed to determine the value of SMRS 142 in the case where the number of presentations concurrently storable in device memory is greater than 1. In this case, when n>1, the method includes determining possible overlaps of storage in device memory of n presentations in a given schedule of presentations (step S198). For example, in one aspect where a series of presentations are stored and deleted in series, the first overlap of storage in device memory occurs at the time of receipt of the nth presentations. Then, the next overlap occurs upon the receipt of the n+1 presentation, as the first presentation is deleted at this time to room for the n+1 presentation. For example, referring to FIG. 8, where n=2, the first overlap of two presentations in device memory occurs at Tcws2, while the next overlap occurs at Tcws3. In this case, since the schedule of presentations only includes P1, P2 and P3, these are the only times of overlap. Similarly, in another example where n=3, referring to FIG. 9, the first and only overlap for the schedule of presentations P1, P2 and P3 occurs at Tcws3.

Further, referring back to FIG. 6, the method further includes determining the sum of the required memory for each presentation at each point of overlap (step S200). For example, referring to FIG. 8, the sum of the required memory is 3 MB at $Tcws_2$, and 2.5 MB at $Tcws_3$. Additionally, referring to FIG. 9, for example, the sum of the required memory is 4.5 MB at $Tcws_3$.

Referring back to FIG. 6, the method further includes setting the subscribed memory requirement per service, SMRS 142, to equal the maximum one of the summed required memories from each overlap (step S202). For example, referring to FIG. 8, the maximum of the sum of the required memories is 3 MB at $Tcws_2$. Additionally, referring to FIG. 9, for example, the maximum is the only overlapping sum, i.e. 4.5 MB at $Tcws_3$.

Thus, where a given number of multiple presentations are storable on the device, the method determines a maximum overlap between the various combinations of presentations storable on the device based on the availability durations of the presentations. The availability duration, in combination with the allowable number of concurrently savable presentations, affects how long a given presentation may be stored in device memory. The value of SMRS 142 relates to a maximum of the sum of required memory amounts associated with each overlap of the given number of presentations.

Figure 8:
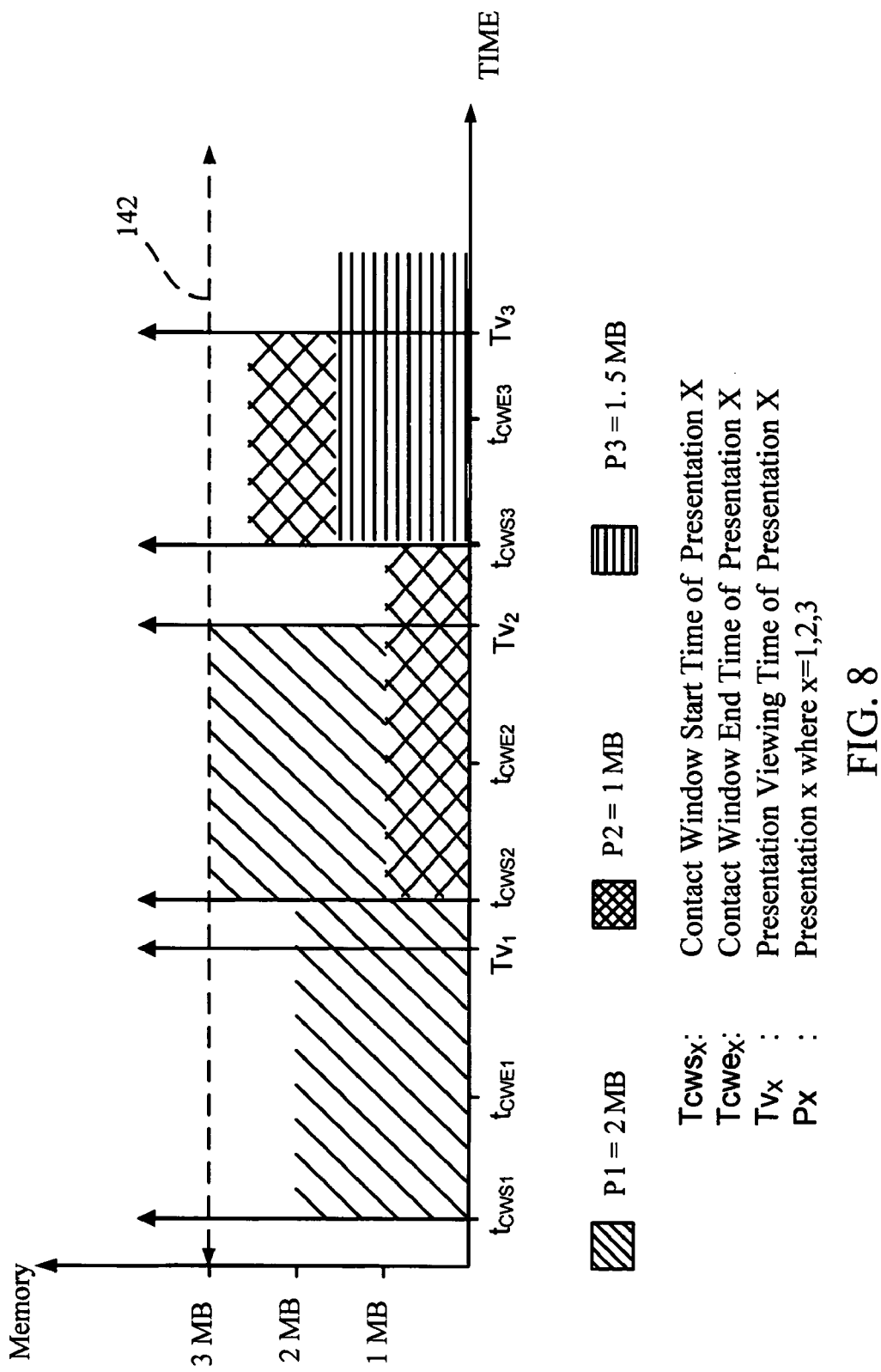
FIG. 8 is a chart of one aspect of presentations stored in memory over time based upon a buffer flag value equal to 2, including the subscribed memory requirement per service according to the flowchart of FIG. 6.
Figure 9:
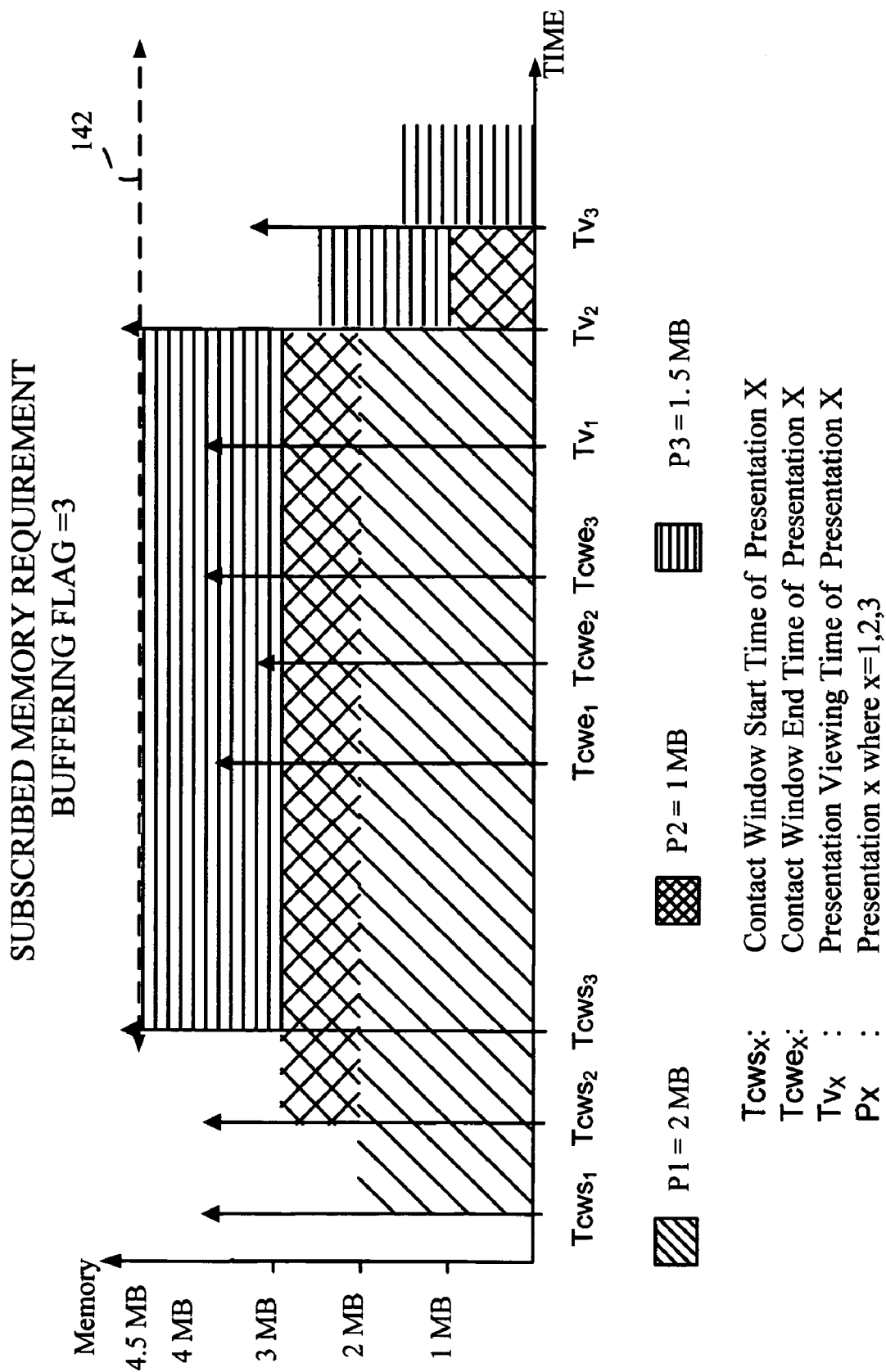
FIG. 9 is a chart of one aspect of presentations stored in memory over time based upon a buffer flag value equal to 3, including the subscribed memory requirement per service according to the flowchart of FIG. 6.

In the examples of FIGS. 8 and 9, the presentations are received and deleted in series. In other aspects, rather than being received in series, the presentations may be receivable in any order. Further, the receipt of some presentations may be missed, and multiple versions of a single presentation may be received in series. In these cases, for example, the value of SMRS 142 may be determined to be n times the maximum one of the required memory of each presentation in the schedule of presentations, i.e. SMRS=n×max [$Psize_i$], where i= 1, . . . N.

The flowchart of FIG. 6, as described above, is but one possible aspect of a method for determining the maximum memory requirement for a selected service comprising a predetermined number of presentations having at least a portion of non-real time content 124 and different values for buffer flag value 146.

Figure 5:
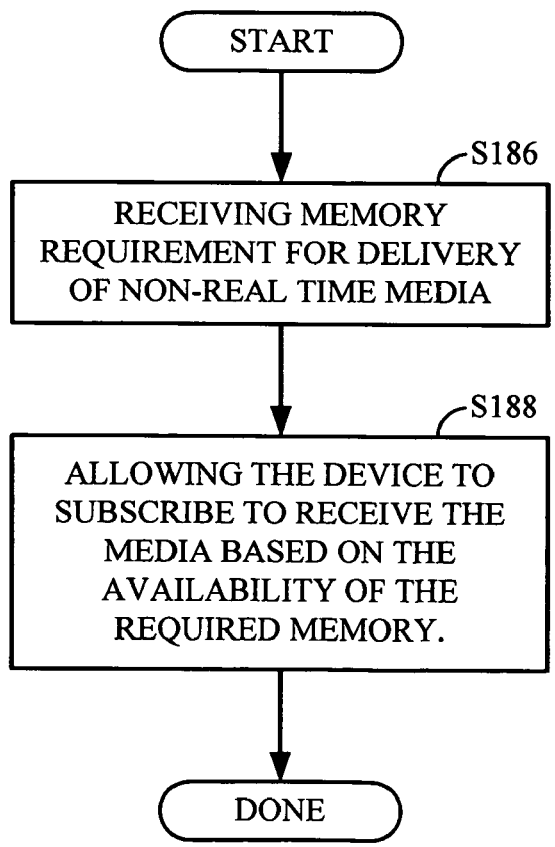
FIG. 5 is a flowchart of one aspect of a method operable on a wireless device for allowing a user to proceed with a request for subscription based upon the availability of sufficient memory for the service according to the system of FIG. 1.

FIG. 5 comprises an aspect of a method, operable by device 116 (FIG. 1), to allow a user of the device to subscribe to a service 122 (FIG. 1) providing at least a portion of non-real time media 124 (FIG. 1). At step S186, a memory requirement for delivering non-real time content to a device is received. For example, in one aspect, device 116 receives the value of SMRS 142 from a component of system 100, such as service provisioning module 108. Additionally, at step S188, the method allows a device to subscribe to a service to receive non-real time media based upon the availability of the required memory on the respective device. For example, referring to FIG. 3, subscription manager module 168 enables a subscription to a service 122 (FIG. 1) if available memory 172 is greater than or equal to SMRS value 142. FIG. 15, discussed below, provides a more detailed description of the service subscription related memory management operations operable on the user device 116.

Figure 10:
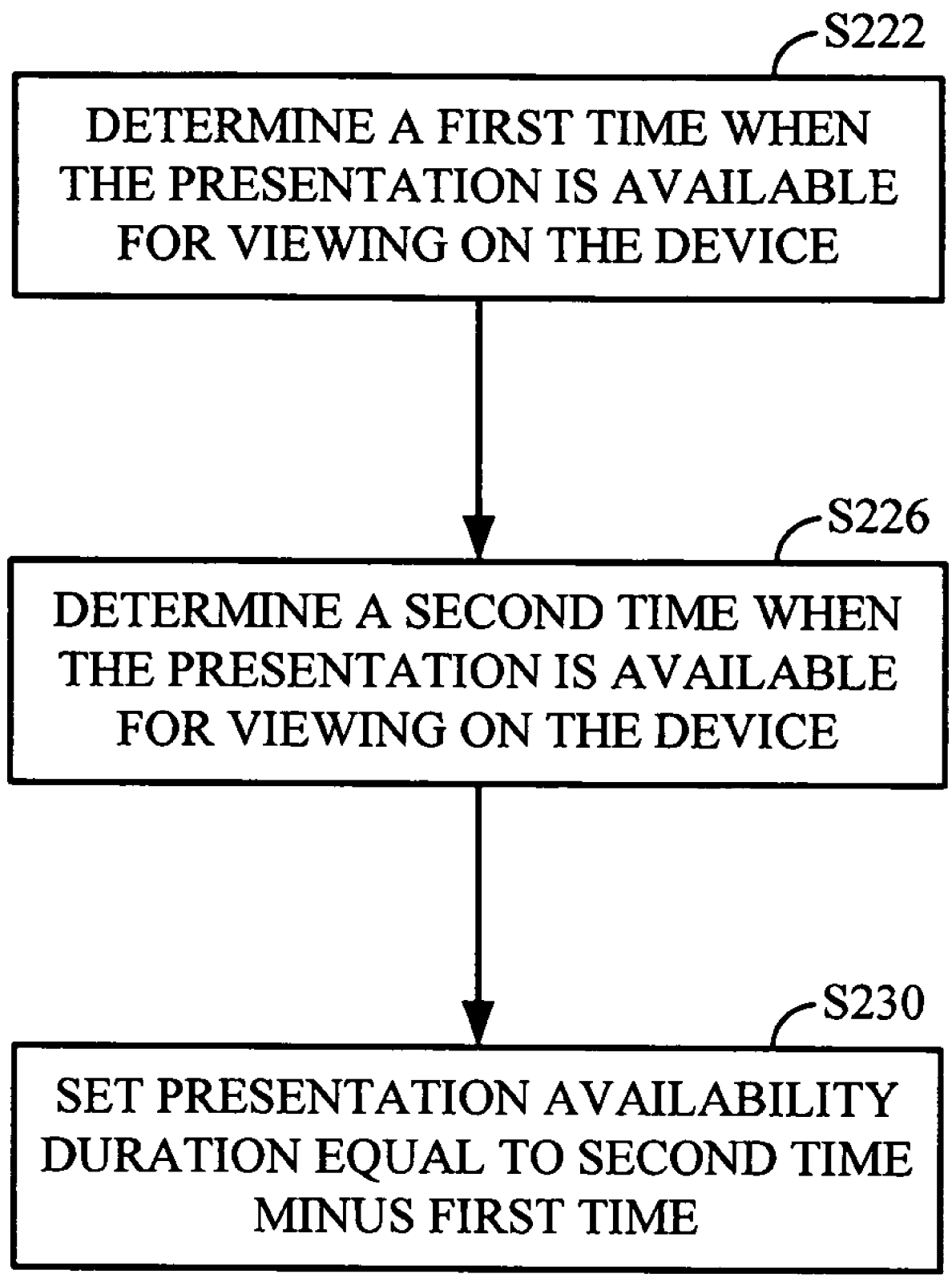
FIG. 10 is a flowchart of one aspect of a method for deriving the availability duration of a presentation according to the system of FIG. 1.

FIG. 10 illustrates a flow method operable by a component of system 100, such as the service planner module 130, to generate PAD 144 (FIG. 2) for each presentation 126. As previously disclosed, PAD 144 is the presentation availability duration within which each presentation 126 is available for viewing. Upon calculation of each PAD 144, the service provisioning server 108 is operable to transmit the PAD 144 to at least one of content server 104 and content distribution server 128, which in turn is operative to transmit the value to each device 116.

At step S222, the method includes determining a first time at which the given presentation is viewable on the respective device. For example, in one aspect, a presentation may be viewable as soon as it is stored in device memory. In alternative aspects, presentations may not be available for viewing until a predetermined time. For example, content retailers may designate certain presentations for viewing only within predetermined windows of time. An example might be a weekly video show, where a whole series of shows is intended to be viewed over the course of a given season of programming.

Further, at step S224, the method includes determining a second time at which the presentation is no longer available for viewing. For example, the end of availability of the presentation may be the time at which it is deleted from the device memory. In other alternatives, the end of availability may be another predetermined time prior to the time of deletion. As an example, such a predetermined time may be at the conclusion a viewing window, a time corresponding to the timed length of the presentation after the latest starting time of the presentation, etc.

Additionally, at step S226, the method further includes setting the availability duration as the difference between the first time and the second time.

Figure 11:
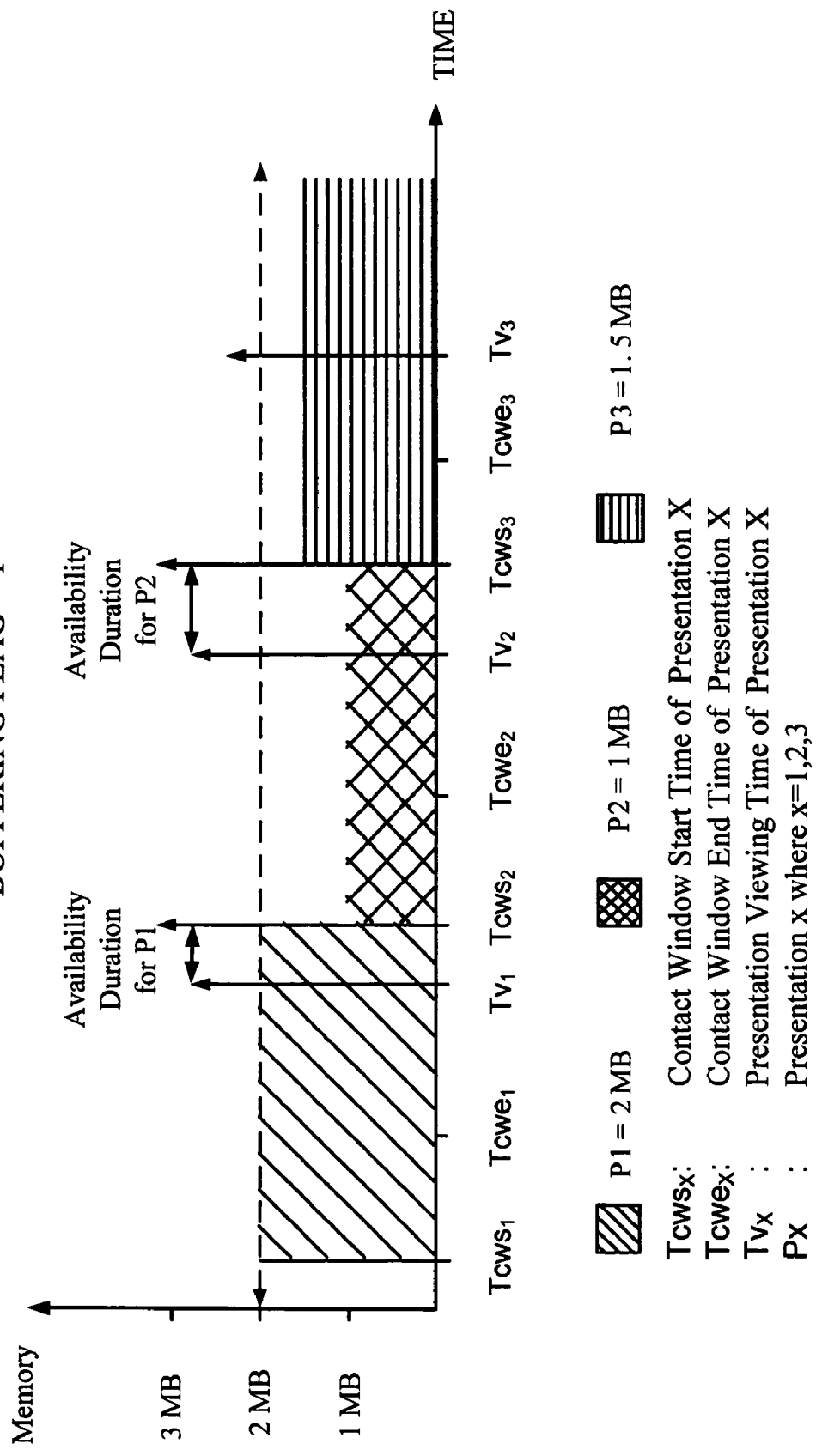
FIG. 11 is a chart of one aspect of presentations stored in memory over time based upon a buffer flag value equal to 1, including the availability duration of a presentation according to the flowchart of FIG. 10.
Figure 12:
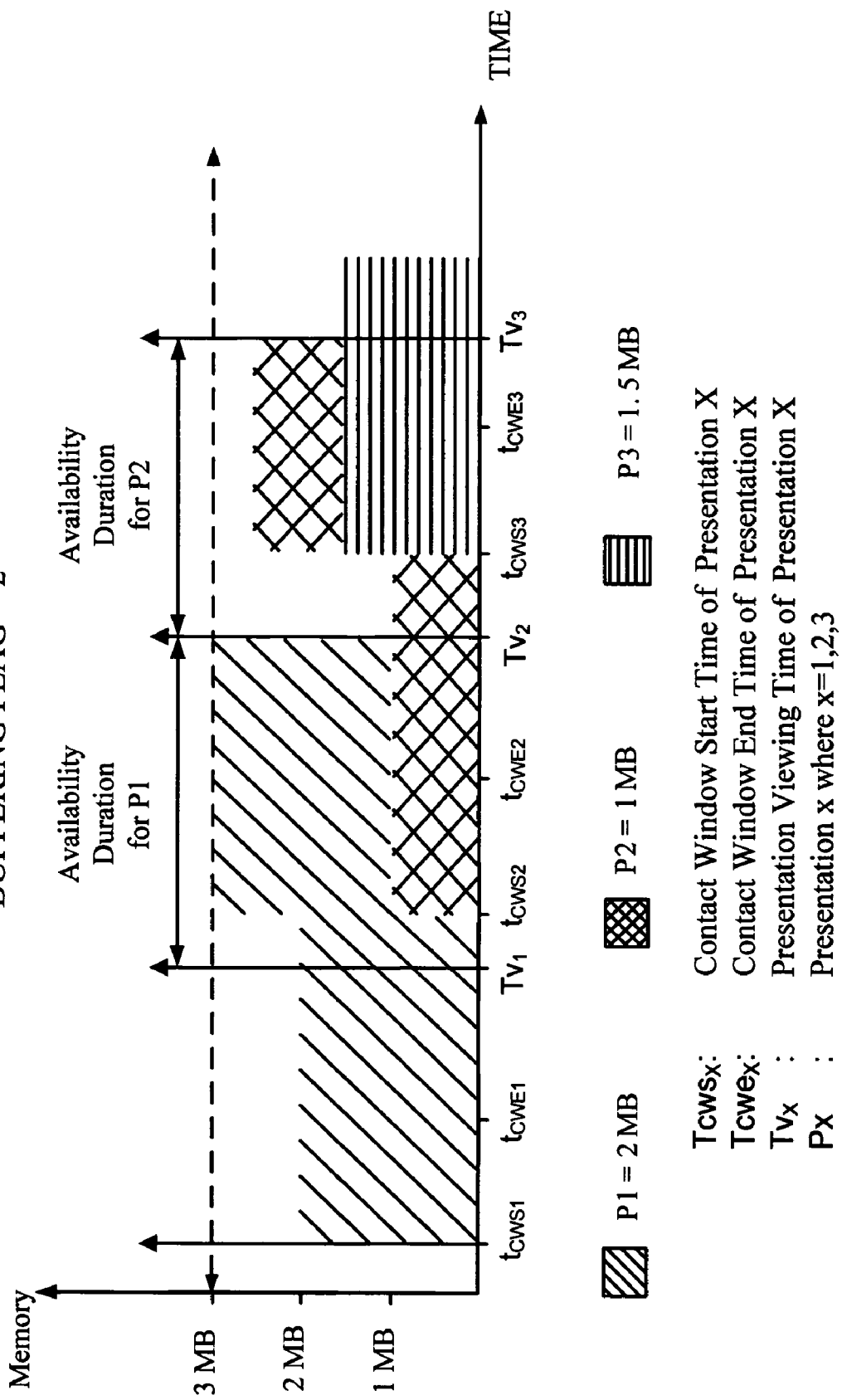
FIG. 12 is a chart of one aspect of presentations stored in memory over time based upon a buffer flag value equal to 2, including the availability duration of a presentation according to the flowchart of FIG. 10.
Figure 13:
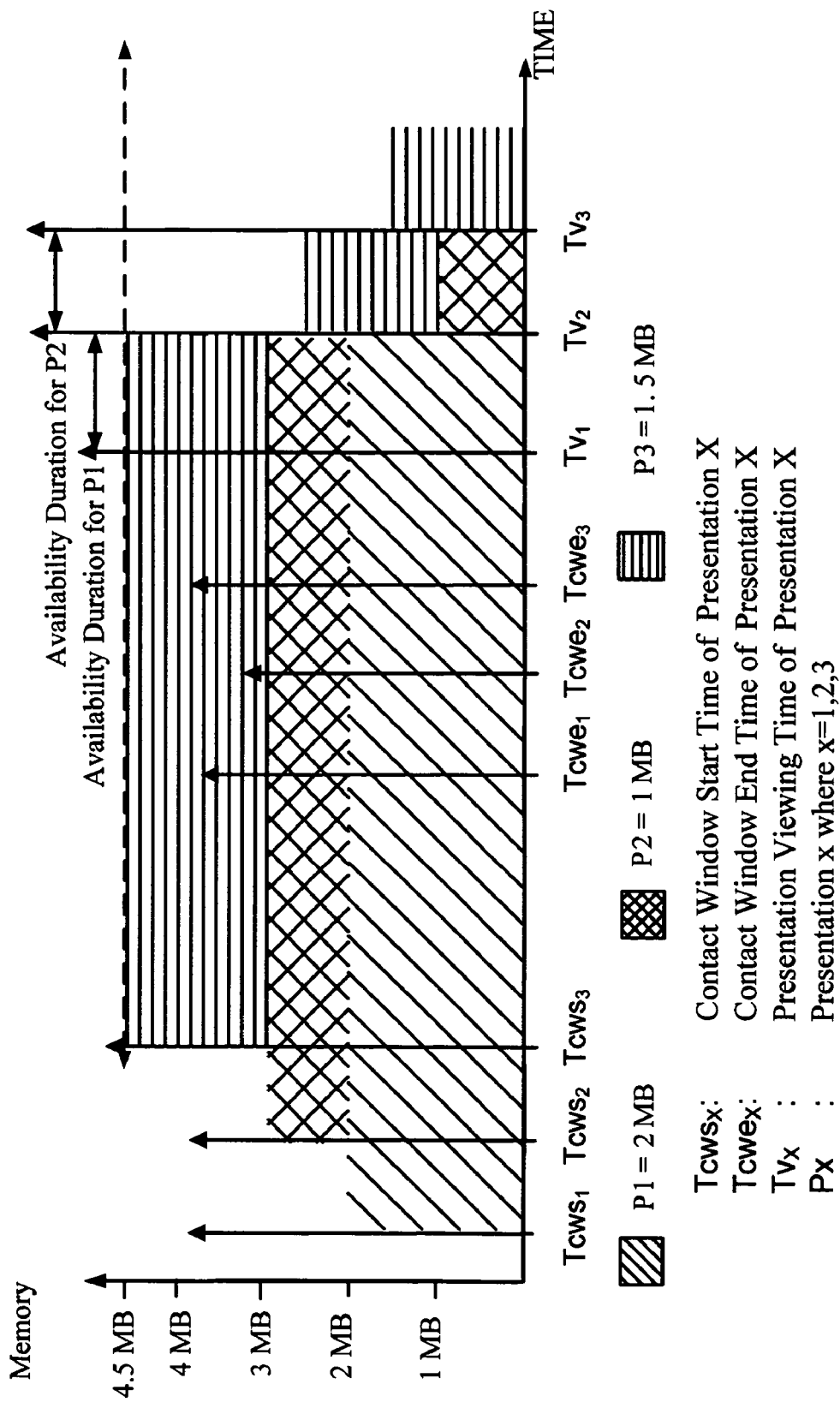
FIG. 13 is a chart of one aspect of presentations stored in memory over time based upon a buffer flag value equal to 3, including the availability duration of a presentation according to the flowchart of FIG. 10.

For example, referring to FIG. 11, where only one presentation at a time may be stored on the device, presentation P1 has a value of ($Tcws_2-Tv_1$) for PAD 144, while the PAD value for P2 is ($Tcws_3-Tv_2$). In this case, since only one presentation is storable at a time, the resident presentation is deleted prior to, or upon, the initiation of downloading of the next presentation. Further, for example, referring to FIG. 12, where two presentations may be stored concurrently in device memory, and where a presentation is deleted upon the beginning of the next presentation viewing time, Tv, PAD 144 for P1 is ($Tv_2-Tv_1$) as P1 is deleted after $Tv_2$ in anticipation of the downloading of P3, which would exceed the buffer value if P1 were not deleted. Further, in FIG. 12, the PAD 144 for P2 is ($Tv_3-Tv_2$) for similar reasons. It should be noted that in the case of FIG. 12, the maximum presentation availability duration for P1 would be (Tcws3−Tcws1), while the maximum presentation availability duration for P2 and P3 is undefined since a respective fourth and fifth presentation which would respectively cause the buffer value of 2 to be exceeded are not included in the example. Additionally, for example, referring to FIG. 13, where three presentations may be stored concurrently in device memory, and where a presentation is deleted upon the beginning of the next presentation viewing time, Tv, PAD 144 for P1 is ($Tv_2-Tv_1$) as P1 is deleted after $Tv_2$, while the PAD 144 for P2 is ($Tv_3-Tv_2$). For similar reasons as discussed above with regard to P3 in FIG. 12, the PAD value 144 for P3 in FIG. 13 is undetermined.

Figure 14:
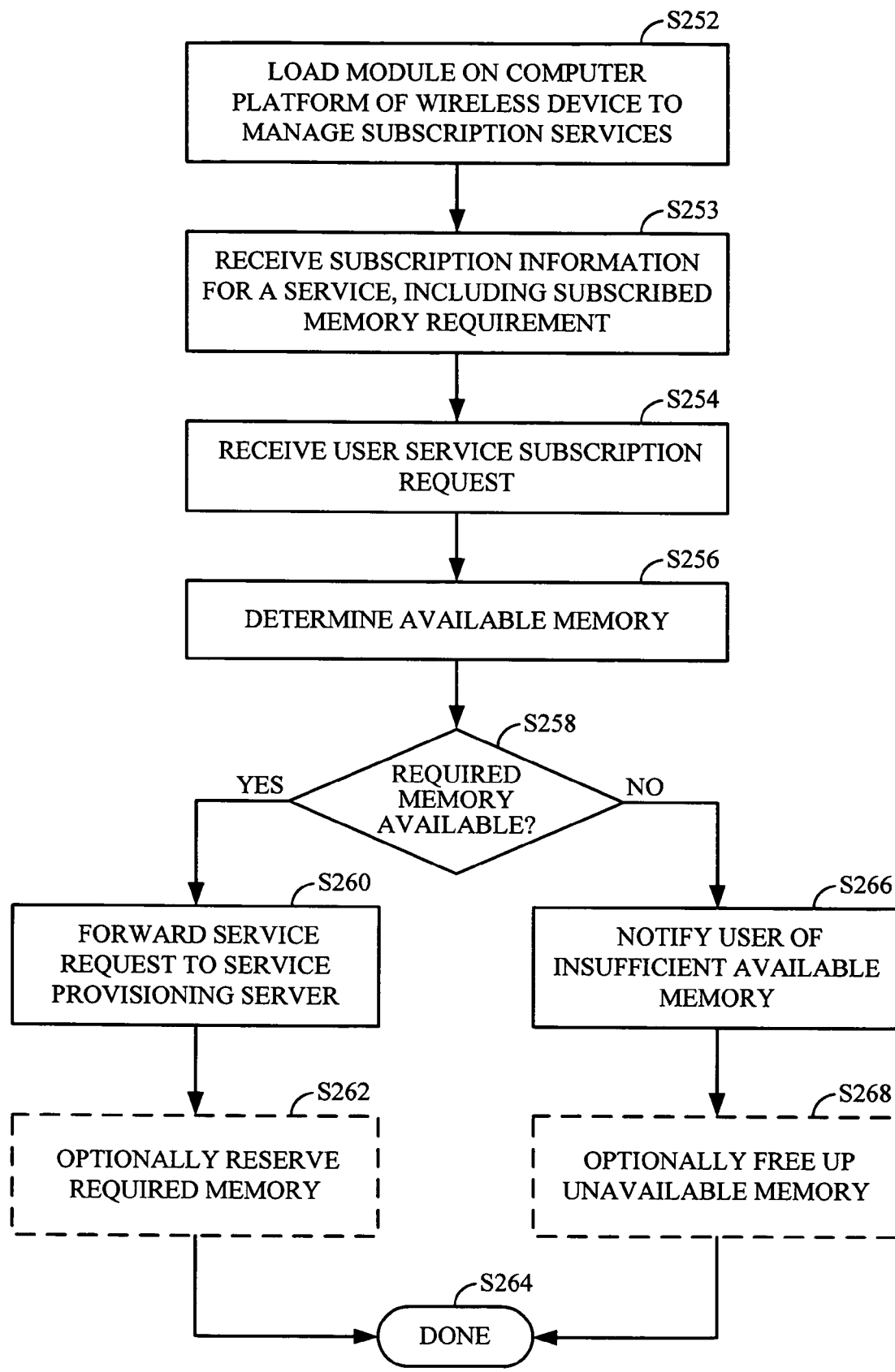
FIG. 14 is a flowchart of one aspect of a method operable on a wireless device to allow a requested service to be subscribed, depending upon the availability of sufficient memory on the device, according to the system of FIG. 1.

FIG. 14 illustrates an aspect of a client side method to manage the subscription of user requested services on a device 116. Specifically, the method described in FIG. 14 may allow a user to subscribe to a service 122 only if the device 116 has sufficient available memory 172 when compared with the SMRS value 142 of the requested service 122.

At step S252, the method includes loading a module on the computer platform of the device to manage subscription services. For example, in one aspect, the Subscription manager module 168 may be downloaded to memory 162 from a network server, i.e. the Application distribution server 110. The time at which Subscription manager module 168 may be downloaded is non-limiting and may be at powering up of device 116, at service activation, or any predetermined time, etc. Under control of API 174, the Subscription manager module 168 is operable to manage all operations regarding subscriptions to service 122.

At step S253, the Subscription manager module 168 may receive information about a subscribing to a service, including the subscribed memory requirement. For example, in one aspect, device 116 receives the MPG/system information 170 from at least one of the Content Server 104 and the Content distribution server 128. Non-limiting, the delivery of the MPG/system information 170 may be at the time of service activation or at a predetermined or user selected time. As disclosed above, the MPG/system information 170 comprises the SMRS 142 for each service comprising non-real time media, and the PAD 144 for each non-real time presentation 126.

At step S254, the method includes receiving a subscription request. For example, the subscription manager module 168 is operable to receive via input mechanism 161 and client UI 164, a request to subscribe to a service comprising a presentation further comprising non-real time content for which a SMRS value 142 has been downloaded as part of the respective MPG/system information 170.

Prior to forwarding the request to the network 118 at step S260, the subscription manager module 168 is operable at step S256 to determine, either by itself or in conjunction with processing subsystems 178, the amount of available memory 172.

If at step S258 the subscription manager module 168 determines that there is sufficient available memory 172 based upon the stored SMRS value 142, the subscription manager module 168 may forward the request to the service provisioning server 108. Optionally, at step S262, the Subscription manager module 168 may be operable to reserve sufficient available memory to guarantee the subsequent download of non-real time presentation content.

On the other hand, if the subscription manager module 168 determines, at step S258, that available memory 172 is insufficient to support the service 122, the subscription manager module 168 may be operable via output mechanism 163 to notify the user. In one aspect, the subscription manager module 168 may simply exit the process at step S264. Alternatively, the subscription manager module 168 may, at step S266, inform the user of how much memory must be freed, and may, at step S268, provide a mechanism, such as a menu, to list files and their memory allocations as well as a mechanism to delete files in order to subscribe to the requested service.

In another aspect, the SMRS 142 may be received upon a request by the user to subscribe to service 122. It should be noted, however, that the time calculating and/or receiving the SMRS may occur at any time, either as a result of an action taken by the user, or automatically by the device based upon an event or based on a schedule, or in anticipation of a scheduled download of a presentation 126.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the various disclosed aspects have been illustrated and described, it will be clear that the subject matter of this document is not limited to these aspects only. For example, although the System Manager 132 has been described as physically removed from the service provisioning server 108, they may be combined together or further separated in any fashion to perform the functions described above. Furthermore, although the Application distribution server 110 is shown independent of the other components of the MDS 100, all components of the MDS 100 may be networked together.

Therefore, while the foregoing disclosure shows illustrative aspects, it should be noted that various changes and modifications could be made herein without departing from the scope of the described aspects as defined by the appended claims. Furthermore, although elements of the described aspects may be described or claimed in the singular, the plural is contemplated unless limitation to the singular is explicitly stated.

What is claimed is:

1. A method of delivering a media service having a plurality of presentations, the method comprising:
   obtaining an indication of an allowed number of non-real time presentations concurrently storable in a memory of a device;
   determining a memory requirement value for each of a plurality of non-real time presentations in a predetermined schedule of non-real time presentations associated with the media service;
   calculating an amount of memory required on the device to receive the media service based upon the determined memory requirement values, the predetermined schedule of non-real time presentations, and the allowed number of non-real time presentations; and
   subscribing the device to the predetermined schedule when the device has a sufficient amount of memory.

2. The method of claim 1, further comprising obtaining a time of delivery to the device and a time of removal from the device for each presentation, and wherein the action of calculating is based on at least one of the time of delivery and the time of removal of each presentation.

3. The method of claim 1, further comprising transmitting the calculated amount of memory required to the device.

4. The method of claim 1, wherein calculating the amount of memory required on the device further comprises determining a maximum memory requirement value derived from a set of the determined memory requirement values, and defining the calculated amount of memory required as the determined maximum memory requirement value.

5. The method of claim 4, wherein determining the maximum memory requirement value further comprises determining a maximum one of the determined memory requirement values for the set.

6. The method of claim 4, wherein determining the maximum memory requirement value further comprises determining a maximum sum of determined memory requirement values for at least one group of respective presentations in the set having at least a portion of a predetermined storage time in the memory of the device occurring at the same time.

7. The method of claim 2, further comprising calculating a presentation availability duration ("PAD") based on the time of delivery and the time of removal, and transmitting the PAD to the device.

8. A service provisioning server, comprising:
   means for obtaining an indication of an allowed number of non-real time presentations storable in a memory of a device;
   means for determining a memory requirement value for storage in the memory of the device of an entirety of each one of a plurality of non-real time presentations in a predetermined schedule of non-real time presentations associated with the media service; and
   means for calculating an amount of memory required on the device to receive the media service based upon the determined memory requirement values of the predetermined schedule of non-real time presentations and the allowed number of non-real time presentations.

9. The service provisioning server of claim 8, further comprising:
   means for determining a presentation availability duration ("PAD") of at least one of the plurality of presentations.

10. A service provisioning computer, comprising a service planner module, the service planning module further comprising a service memory requirement per service ("SMRS") module, the SMRS module operable to receive a buffer value indicating an an allowed number of non-real time presentations storable on the device, to receive a memory requirement value of each non-real time presentation associated with a media service, and to calculate an amount of memory required on the device to receive the media service based on the buffer value and the respective received memory requirement values.

11. The server of claim 10, wherein the service planner module further comprises a presentation availability duration ("PAD") module operable, based upon the received buffer value, to calculate an interval during which each presentation associated with the media service is available for viewing.

12. The server of claim 10, wherein the service provisioning module is operable to generate a service line-up message.

13. A method of controlling subscription to a media service on a device, comprising:
   receiving a memory requirement for the service based on an amount of memory required for storing an entirety of each one of a plurality of non-real time presentations in a predetermined schedule of non-real time presentations associated with the service, and further based on an allowed number of non-real time presentations storable on the device;
   determining an available memory on the device; and
   allowing the device to subscribe to the service based upon a predetermined relationship between the available memory and the memory requirement.

14. The method of claim 13, wherein allowing further comprises comparing the available memory to the memory requirement, and allowing the device to subscribe if the available memory is at least equal to the memory requirement.

15. The method of claim 13, wherein allowing further comprises comparing the available memory to the memory requirement, and not allowing the device to subscribe if the available memory is less than the memory requirement.

16. The method of claim 13, further comprising notifying the device of insufficient available memory to support the media service.

17. The method of claim 13, further comprising reserving at least a portion of the available memory based on the memory requirement.

18. The method of claim 13, further comprising initiating a release of unavailable memory if there is insufficient available memory to support the media service.

19. The method of claim 13, further comprising receiving a presentation availability duration ("PAD") value associated with at least one presentation associated with the service, and presenting the PAD on the device.

20. An apparatus operable to control subscription to a media service, comprising:
   means for receiving a memory requirement for the service based on an amount of memory required for storing an entirety of each one of a plurality of non-real time presentations in a predetermined schedule of non-real time presentations associated with the service, and further based on an allowed number of non-real time presentations storable on the device;
   means for determining available memory on the device; and
   means for allowing subscription to the service based upon a predetermined relationship between the available memory and the memory requirement.

21. A wireless communication device, comprising:
a memory storing an available memory value and a memory requirement value, wherein the memory requirement value is based on an amount of memory required for storing an entirety of each one of a plurality of non-real time presentations in a predetermined schedule of non-real time presentations associated with a subscription to a given media service, and further based on an allowed number of non-real time presentations storable on the device; and
a subscription manager module that determines whether to subscribe to the service based on a comparison of the available memory to the memory requirement and when a determination is made to subscribe generates messages to subscribe.

22. The device of claim 21, wherein the service further comprises real time content.

23. The device of claim 21, wherein the subscription manager module is further operable to generate a notification of insufficient memory to subscribe to the service if the available memory is less than the memory requirement.

24. The device of claim 21, wherein the subscription manager module is further operable to reserve at least a portion of the available memory based on the memory requirement.

25. The device of claim 21, wherein the subscription manager module is further operable initiate making unavailable memory available if the available memory is less than the memory requirement.

26. The device of claim 21, wherein the memory further comprises a presentation availability duration ("PAD") value corresponding to at least one of the plurality of non-real time presentations, and further comprising a device interface operable to generate a representation of the PAD.

27. The device of claim 21, wherein the subscription manager module is further operable determine the ability to subscribe in response to a received subscription request.

28. A computer program product, comprising:
a computer-readable medium, comprising:
a first set of codes for causing a computer to receive a memory requirement for the service service based on an amount of memory required for storing an entirety of each one of a plurality of non-real time presentations in a predetermined schedule of non-real time presentations associated with the service, and further based on an allowed number of non-real time presentations storable on the device;
a second set of codes for causing the computer to determine an available memory on the device; and
a third set of codes for causing the computer to allow the user to subscribe to the service, based upon a predetermined relationship between the available memory and the memory requirement.

29. At least one processor configured to control subscription to
a media service on a device:
a first module for receiving a memory requirement for the service based on an amount of memory required for storing an entirety of each one of a plurality of non-real time presentations in a predetermined schedule of non-real time presentations associated with the service, and further based on an allowed number of non-real time presentations storable on the device;
a second module for determining an available memory on the device; and a third module for allowing the user to subscribe to the service, based upon a predetermined relationship between the available memory and the memory requirement.

30. A computer program product, comprising:
a computer-readable medium, comprising:
a first set of codes for causing a computer to receive an indication of an allowed number of non-real time presentations storable in a memory of a device;
a second set of codes for causing the computer to determine a memory requirement value for storage in the memory of the device of an entirety of each one of a plurality of non-real time presentations in a predetermined schedule of non-real time presentations associated with the media service; and
a third set of codes for causing the computer to calculate an amount of memory required on the device based upon the determined memory requirement values of the predetermined schedule of non-real time presentations and the allowed number of non-real time presentations.

31. At least one processor configured to deliver a media service, comprising:
a first module for receiving an indication of an allowed number of non-real time presentations storable in a memory of a device;
a second module for determining a memory requirement value for storage in the memory of the device of an entirety of each one of a plurality of non-real time presentations in a predetermined schedule of non-real time presentations associated with the media service; and
a third module for calculating an amount of memory required on the device based upon the determined memory requirement values of the predetermined schedule of non-real time presentations and the allowed number of non-real time presentations.

32. The method of claim 6, wherein determining a maximum sum of determined memory requirement values further comprises determining an overlap in storage in the memory of the device based on a time of delivery to the device and a time of removal from the device both corresponding to each of the respective presentations.

33. The method of claim 6, wherein determining a maximum sum of determined memory requirement values further comprises determining an overlap in storage in the memory of the device based on a presentation availability duration corresponding to each of the respective presentations.

34. The method of claim 6, wherein determining a maximum sum of determined memory requirement values further comprises determining an overlap in storage in the memory of the device based on a contact window opening time and a viewing window conclusion time both corresponding to each of the respective presentations.

35. The method of claim 1, wherein the step of subscribing comprises:
receiving from the device a request for a subscription to the media service and an amount of available memory on the device; and
transmitting to the device the respective non-real time presentations corresponding to the predetermined schedule if the amount of available memory on the device is at least equal to the calculated amount of memory required.

36. The method of claim 1, further comprising:
transmitting a media program guide system information message to the device, wherein the media program guide system information message comprises the calculated amount of memory required;

wherein the step of subscribing includes receiving from the device a request for a subscription to the media service, wherein the received request is based on a determination on the device that an amount of available memory on the device is at least equal to the calculated amount of memory required; and transmitting to the device the respective non-real time presentations corresponding to the predetermined schedule.

37. The method of claim 1, further comprising:

transmitting a service line-up message to the device, wherein the service line-up message comprises a buffering flag representative of the allowed number of non-real time presentations, the calculated amount of memory required, and a presentation availability duration for each one of a plurality of non-real time presentations;

wherein the step of subscribing includes receiving from the device a request for a subscription to the media service, wherein the received request is based on a determination on the device that an amount of available memory on the device is at least equal to the calculated amount of memory required; and transmitting to the device the respective non-real time presentations corresponding to the predetermined schedule.

38. The service provisioning computer of claim 10, wherein the amount of memory required on the device further comprises a maximum memory requirement value derived from a set of the memory requirement values.

39. The service provisioning computer of claim 38, wherein the maximum memory requirement value further comprises a maximum one of the memory requirement values for the set.

40. The service provisioning computer of claim 38, wherein the maximum memory requirement value further comprises a maximum sum of the memory requirement values for at least one group of respective presentations in the set having at least a portion of a predetermined storage time in the memory of the device occurring at the same time.

41. The service provisioning computer of claim 40, wherein the maximum sum of memory requirement values is based on an overlap in storage in the memory of the device based on a time of delivery to the device and a time of removal from the device both corresponding to each of the respective presentations.

42. The service provisioning computer of claim 40, wherein the maximum sum of memory requirement values is based on an overlap in storage in the memory of the device based on a presentation availability duration corresponding to each of the respective presentations.

43. The service provisioning computer of claim 40, wherein the maximum sum of memory requirement values is based on an overlap in storage in the memory of the device based on a contact window opening time and a viewing window conclusion time both corresponding to each of the respective presentations.

44. The service provisioning computer of claim 10, wherein the SMRS module is further operable to receive from the device a request for a subscription to the media service and an amount of available memory on the device, and to determine a request fulfillment if the amount of available memory on the device is at least equal to the calculated amount of memory required.

45. The service provisioning computer of claim 10, wherein the SMRS module is further operable to initiate transmission of a media program guide system information message to the device, wherein the media program guide system information message comprises the calculated amount of memory required, wherein the SMRS module is further operable to receive from the device a request for a subscription to the media service, wherein the received request is based on a determination on the device that an amount of available memory on the device is at least equal to the calculated amount of memory required, and wherein the SMRS module is further operable to initiate transmission to the device of the respective non-real time presentations corresponding to the predetermined schedule.

46. The service provisioning computer of claim 10, wherein the SMRS module is further operable to initiate transmission of a service line-up message to the device, wherein the service line-up message comprises a buffering flag representative of the allowed number of non-real time presentations, the calculated amount of memory required, and a presentation availability duration for each one of a plurality of non-real time presentations, wherein the SMRS module is further operable to receive from the device a request for a subscription to the media service, wherein the received request is based on a determination on the device that an amount of available memory on the device is at least equal to the calculated amount of memory required, and wherein the SMRS module is further operable to initiate transmission to the device of the respective non-real time presentations corresponding to the predetermined schedule.

47. The method of claim 14, further comprising receiving a subscription request corresponding to the media service, forwarding the subscription request to the media service, and receiving and storing in memory a respective one of the plurality of non-real time presentations in the predetermined schedule.

48. The method of claim 47, further comprising receiving and storing a presentation availability duration corresponding to the respective one of the plurality of non-real time presentations in the predetermined schedule, and removing the respective one of the plurality of non-real time presentations in the predetermined schedule based on the presentation availability duration.

49. The method of claim 47, further comprising receiving the allowed number of non-real time presentations storable on the device, and removing the respective one of the plurality of non-real time presentations in the predetermined schedule based on the allowed number of non-real time presentations storable on the device.

50. The method of claim 13, wherein receiving the memory requirement further comprises receiving a maximum memory requirement value derived from the amount of memory required for respective ones of a set of the plurality of non-real time presentations.

51. The method of claim 50, wherein receiving a maximum memory requirement value further comprises receiving a maximum one of the amount of memory required for respective ones of the set.

52. The method of claim 50, wherein receiving a maximum memory requirement value further comprises receiving a maximum sum of the amount of memory required for at least one group of respective presentations in the set having at least a portion of a predetermined storage time in the memory of the device occurring at the same time.

53. The method of claim 52, wherein receiving the maximum sum of the amount of memory required for the at least one group of respective presentations in the set is based on an overlap in storage in the memory of the device based on a time of delivery to the device and a time of removal from the device both corresponding to each of the respective presentations.

54. The method of claim 52, wherein receiving the maximum sum of the amount of memory required for the at least one group of respective presentations in the set is based on an overlap in storage in the memory of the device based on a presentation availability duration corresponding to each of the respective presentations.

55. The method of claim 52, wherein receiving the maximum sum of the amount of memory required for the at least one group of respective presentations in the set is based on an overlap in storage in the memory of the device based on a contact window opening time and a viewing window conclusion time both corresponding to each of the respective presentations.

56. The device of claim 21, wherein based upon a determination that the available memory at least equals the memory requirement, the subscription manager module is further operable to receive a subscription request corresponding to the media service and forward the subscription request to the media service, and wherein the memory is further operable to receive and store a respective one of the plurality of non-real time presentations in the predetermined schedule based on fulfillment of the subscription request.

57. The device of claim 56, wherein the subscription manager module is further operable to receive a presentation availability duration corresponding to the respective one of the plurality of non-real time presentations in the predetermined schedule, and wherein the subscription manager module is further operable to initiate removal from the memory of the respective one of the plurality of non-real time presentations in the predetermined schedule based on the presentation availability duration.

58. The device of claim 56, wherein the subscription manager module is further operable to receive the allowed number of non-real time presentations storable on the device, and wherein the subscription manager module is further operable to initiate removal from the memory of the respective one of the plurality of non-real time presentations in the predetermined schedule based on the allowed number of non-real time presentations storable on the device.

59. The device of claim 21, wherein the memory requirement further comprises a maximum memory requirement value derived from the amount of memory required for respective ones of a set of the plurality of non-real time presentations.

60. The device of claim 59, wherein the maximum memory requirement value further comprises a maximum one of the amount of memory required for respective ones of the set.

61. The device of claim 59, wherein the maximum memory requirement value further comprises a maximum sum of the amount of memory required for at least one group of respective presentations in the set having at least a portion of a predetermined storage time in the memory of the device occurring at the same time.

62. The device of claim 61, wherein the maximum sum is further based on an overlap in storage in the memory of the device based on a time of delivery to the device and a time of removal from the device both corresponding to each of the respective presentations.

63. The device of claim 61, wherein the maximum sum is further based on an overlap in storage in the memory of the device based on a presentation availability duration corresponding to each of the respective presentations.

64. The device of claim 61, wherein the maximum sum is further based on an overlap in storage in the memory of the device based on a contact window opening time and a viewing window conclusion time both corresponding to each of the respective presentations.

* * * * *